(12) United States Patent
Mitsunaga et al.

(10) Patent No.: US 11,791,501 B2
(45) Date of Patent: Oct. 17, 2023

(54) DIRECT CURRENT POWER SUPPLYING SYSTEM

(71) Applicant: TDK CORPORATION, Tokyo (JP)

(72) Inventors: Takuma Mitsunaga, Tokyo (JP); Katsuo Naoi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 768 days.

(21) Appl. No.: 16/961,574

(22) PCT Filed: Jan. 23, 2018

(86) PCT No.: PCT/JP2018/001975
§ 371 (c)(1),
(2) Date: Jul. 10, 2020

(87) PCT Pub. No.: WO2019/145999
PCT Pub. Date: Aug. 1, 2019

(65) Prior Publication Data
US 2021/0066912 A1 Mar. 4, 2021

(51) Int. Cl.
*H01M 10/42* (2006.01)
*H02J 7/00* (2006.01)
(Continued)

(52) U.S. Cl.
CPC ....... *H01M 10/425* (2013.01); *H01M 10/441* (2013.01); *H01M 10/443* (2013.01);
(Continued)

(58) Field of Classification Search
CPC ............. H01M 10/425; H01M 10/441; H01M 10/443; H01M 10/48; H02J 7/007194; H02J 7/0048; H02J 1/102; H02J 1/12
(Continued)

(56) References Cited

U.S. PATENT DOCUMENTS 9,742,211 B2 8/2017 Stevens et al.
2015/0303719 A1 10/2015 Takahashi et al.
(Continued)

FOREIGN PATENT DOCUMENTS

JP  2000-295784  10/2000
JP  2008-182810   8/2008
(Continued)

OTHER PUBLICATIONS

India Official Action, dated May 18, 2021 by Intellectual Property India, for India Patent Application No. 202047031078.
(Continued)

*Primary Examiner* — Hal Kaplan
(74) *Attorney, Agent, or Firm* — GREENBLUM & BERNSTEIN, P.L.C.

(57) ABSTRACT

The life of a plurality of storage batteries as a whole is increased. A DC power supplying system includes power conditioners that supply generated power generated at power generators to a DC bus, storage batteries, storage batteries that have a superior cycle characteristic, bidirectional DC/DC converters that perform power conversion between generated power supplied to the DC bus and charging power of the storage batteries, bidirectional DC/DC converters that perform power conversion between generated power and charging power of the second storage batteries, DC/DC converters that supply the generated power and the charging power to load appliances, and an energy management system that is operable when an absolute value of a power difference between the generated power and the load power supplied to the load appliances is equal to or greater than a power threshold to operate the DC converters.

2 Claims, 2 Drawing Sheets

(51) Int. Cl.
*H01M 10/44* (2006.01)
*H02J 1/10* (2006.01)
*H02J 1/12* (2006.01)
*H01M 10/48* (2006.01)

(52) U.S. Cl.
CPC .............. *H01M 10/48* (2013.01); *H02J 1/102* (2013.01); *H02J 1/12* (2013.01); *H02J 7/0048* (2020.01); *H02J 7/007194* (2020.01)

(58) Field of Classification Search
USPC .......................................................... 307/46
See application file for complete search history.

(56) References Cited

U.S. PATENT DOCUMENTS

2016/0137092 A1* 5/2016 Thieme ............... B60W 30/192
307/10.6

2017/0214265 A1 7/2017 Stevens et al.

FOREIGN PATENT DOCUMENTS

| | | |
|---|---|---|
| JP | 2011-222427 | 11/2011 |
| JP | 5028517 | 6/2012 |
| JP | 2014-209821 | 11/2014 |
| JP | 2015-165732 | 9/2015 |
| JP | 2016-152641 | 8/2016 |
| JP | 2017-529647 | 10/2017 |
| JP | 2017-212803 | 11/2017 |
| KR | 2017-0026576 A | 3/2017 |
| WO | 2014/118903 | 8/2014 |

OTHER PUBLICATIONS

Official Communication issued in International Bureau of WIPO Patent Application No. PCT/JP2018/001975, dated Mar. 6, 2018.

* cited by examiner

DIRECT CURRENT POWER SUPPLYING SYSTEM

TECHNICAL FIELD

The present invention relates to a standalone direct current (DC) power supplying system that is not connected to commercial power.

BACKGROUND ART

As one example of a DC power supplying system of this type, the DC power supplying system disclosed in Patent Literature 1 cited below is known. This DC power supplying system includes a distributed power supply (for example, a device such as a solar power generator, a wind power generator, or a fuel cell), a DC bus that connects the distributed power supply to a load, a plurality of DC power supplies (chargeable/dischargeable power supplies which include storage batteries), converters (for example, bidirectional DC/DC converters) for connecting the plurality of DC power supplies to the DC bus, and a controller for controlling the plurality of converters. In this DC power supplying system, home appliances, such as air conditioners, televisions and lighting equipment, and information devices, such as personal computers, are connected to the DC bus as loads and operate by receiving DC power (a DC voltage) from the DC bus. In this DC power supplying system, when the voltage supplied to the DC bus by the distributed power supply differs to a predetermined value, the controller performs control so that power is supplied from a DC power supply to the DC bus by at least one converter and DC power is supplied by another at least one converter from the DC bus to another DC power supply so as to keep the voltage of the DC bus at the predetermined value. In this DC power supplying system, for the controller to effectively perform control, it is desirable for the storage batteries constructing the respective DC power supplies to be the same (that is, to be storage batteries with the same storage capacity and the same current capacity).

According to this DC power supplying system, even when there are large fluctuations in the DC voltage outputted from the distributed power supply to the DC bus, it is possible to stabilize the voltage (the DC voltage) of the DC bus, which makes it possible to supply a stable output voltage (the DC voltage) to a load connected to the DC bus.

CITATION LIST

Patent Literature

Patent Literature 1
Japanese Patent Number 5,028,517 (see pages 3-8 and FIGS. 1 and 2)

SUMMARY OF INVENTION

Technical Problem

However, the conventional DC power supplying system described above has the following problem. That is, with this DC power supplying system, a construction equipped with a plurality of DC power supplies including the same storage batteries is configured so that while power is being supplied from one DC power supply to the DC bus by at least one converter, DC power is also supplied by at least one other converter from the DC bus to another DC power supply so as to keep the voltage of the DC bus at a predetermined value. This means that in the above DC power supplying system, due to the storage batteries that construct the DC power supplies being charged and discharged at different timings, a difference is produced in the number of charging and discharging cycles between the storage batteries. This means that compared to a configuration where storage batteries are used in an arrangement that keeps the number of charging and discharging cycles equal, there is a problem to be solved of the life of the storage batteries as a whole becoming shorter.

The present invention was conceived in view of the problem described above and has a principal object of providing a DC power supplying system capable of lengthening the life of a plurality of storage batteries as a whole.

Solution to Problem

To achieve the stated object, a direct current (DC) power supplying system according to the present invention comprises: a DC bus that serves as a bus line of a DC power supply; a power generator; a first converter that supplies generated power generated at the power generator to the DC bus; a first storage battery; a second storage battery that has a superior cycle characteristic compared to the first storage battery; a first bidirectional converter that is connected between the first storage battery and the DC bus, bidirectionally converts power between the generated power supplied to the DC bus and charging power of the first storage battery, and supplies power from the DC bus to the first storage battery or from the first storage battery to the DC bus; a second bidirectional converter that is connected between the second storage battery and the DC bus, bidirectionally converts power between the generated power supplied to the DC bus and charging power of the second storage battery, and supplies power from the DC bus to the second storage battery or from the second storage battery to the DC bus; a second converter that supplies DC power that is at least one of the generated power supplied to the DC bus and the charging power to a load appliance; and a controller that is operable when an absolute value of a power difference between the generated power generated at the power generator and the load power being supplied to the load appliance is equal to or greater than a power threshold set in advance, to operate the second bidirectional converter and operable when the absolute value of the power difference is less than the power threshold to operate the first bidirectional converter.

By doing so, it is possible to lengthen (extend) the life of the storage batteries as a whole and in turn to lengthen (extend) the life of the DC power supplying system as a whole by making selective use of first storage batteries that have a normal cycle characteristic and second storage batteries that have a superior cycle characteristic, while minimizing, through the concurrent use of storage batteries that have a normal cycle characteristic (that is, lower-cost storage batteries), the increase in the overall cost of the DC power supplying system, compared to a case where all of the storage batteries are composed of second storage batteries that have a superior cycle characteristic.

A direct current (DC) power supplying system according to the present invention comprises: a DC bus that serves as a bus line of a DC power supply; a power generator; a first converter that supplies generated power generated at the power generator to the DC bus; a first storage battery; a second storage battery that has a superior cycle characteristic compared to the first storage battery; a first bidirectional converter that is connected between the first storage battery and the DC bus, bidirectionally converts power between the generated power supplied to the DC bus and charging power of the first storage battery, and supplies power from the DC bus to the first storage battery or from the first storage battery to the DC bus; a second bidirectional converter that is connected between the second storage battery and the DC bus, bidirectionally converts power between the generated power supplied to the DC bus and charging power of the second storage battery, and supplies power from the DC bus to the second storage battery or from the second storage battery to the DC bus; a second converter that supplies DC power that is at least one of the generated power supplied to the DC bus and the charging power to a load appliance; a temperature meter that measures a battery temperature of the first storage battery and the second storage battery; and a controller that is operable when the measured battery temperature is equal to or greater than a temperature threshold set in advance, to operate the second bidirectional converter and operable when the battery temperature is less than the temperature threshold to operate the first bidirectional converter.

By doing so, even in an environment where the temperature of the storage batteries may become high (that is, may rise to the temperature threshold or higher), it is possible to lengthen (extend) the life of the storage batteries as a whole and in turn to lengthen (extend) the life of the DC power supplying system as a whole by making selective use of first storage batteries that have a normal cycle characteristic and second storage batteries that have a superior cycle characteristic, while minimizing, through the concurrent use of storage batteries that have a normal cycle characteristic (that is, lower-cost storage batteries), the increase in the overall cost of the DC power supplying system, compared to a case where all of the storage batteries are composed of second storage batteries that have a superior cycle characteristic.

Advantageous Effects of Invention

According to the present invention, it is possible to lengthen the life of a plurality of storage batteries as a whole while minimizing an increase in cost.

DESCRIPTION OF EMBODIMENTS

Figure 1:
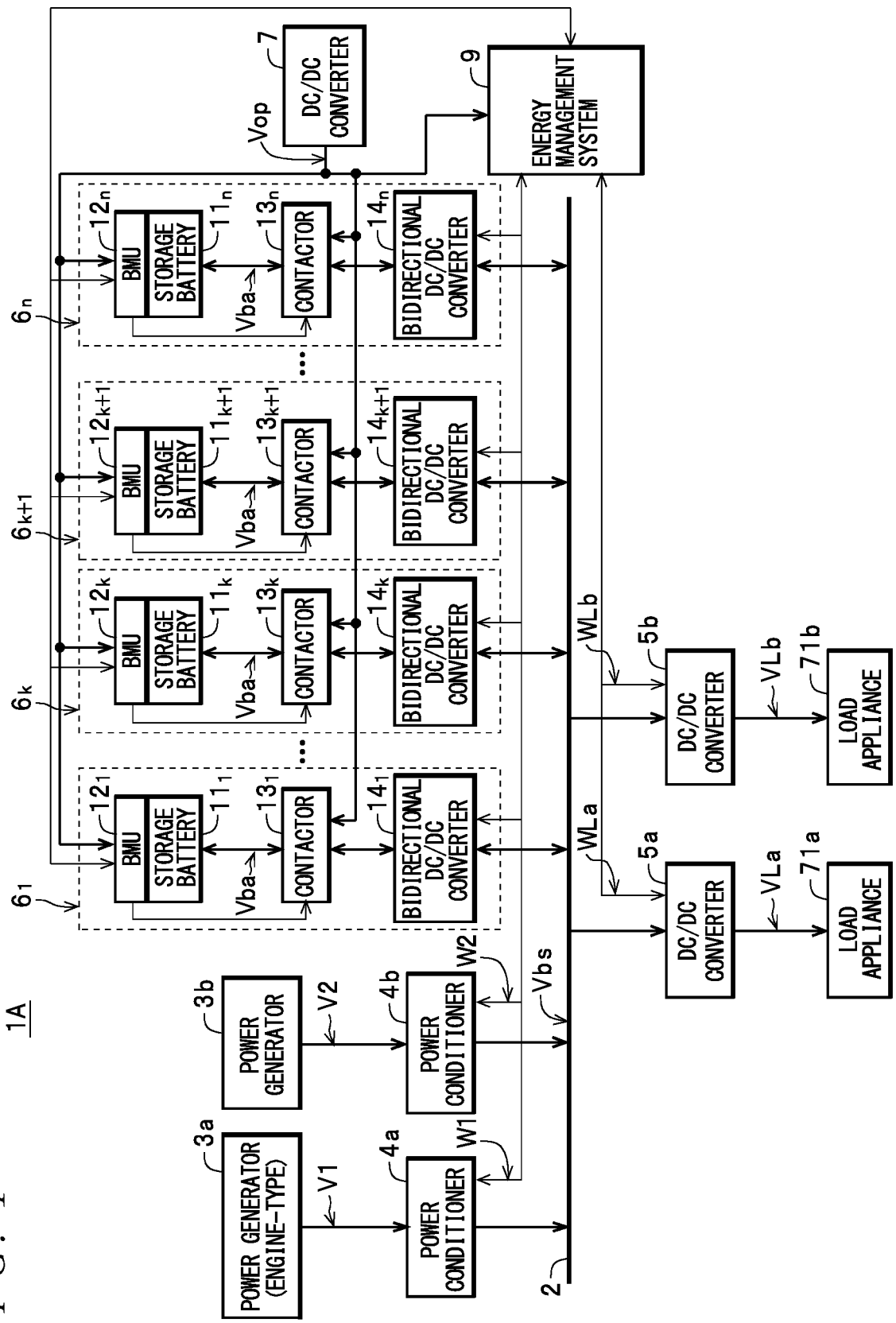
FIG. 1 is a diagram depicting the configuration of a DC power supplying system 1A.

Preferred embodiments of a DC power supplying system will now be described with reference to the attached drawings. Note that the DC power supplying system according to the present invention is not limited to the embodiments described below. The component elements described below also include component elements that would be obvious to those skilled in the art and component elements that are effectively the same, with it also being possible to combine such component elements as appropriate.

First, the configuration of a DC power supplying system 1A as a DC power supplying system according to the present invention will be described.

The DC power supplying system 1A includes a DC bus 2, one or two or more power generators 3 (as one example in the present embodiment, two power generators 3a and 3b, hereinafter collectively referred to as the "power generators 3" when no distinction is made between them), first converters 4 disposed corresponding to the power generators 3 (as one example in the present embodiment, two power conditioners 4a and 4b described later), second converters 5 (as one example in the present embodiment, two second converters 5a and 5b described later, hereinafter collectively referred to as the "second converters 5" when no distinction is made between them) disposed corresponding to load appliances 71 connected to the DC power supplying system 1A (as one example in the present embodiment, two load appliances 71a and 71b, hereinafter collectively referred to as the "load appliances 71" when no distinction is made between them), a plurality of DC power supplies 6 (DC power supplies $6_1$, $6_2$, ..., $6_n$), a third converter 7, and an energy management system 9. The DC power supplying system 1A is configured as a standalone DC power supplying system that is capable of generating a DC voltage based on the power generated by the power generators 3 and supplying to the one or two or more load appliances 71 (that is, a DC power supplying system that is not connected to commercial power (that is, commercial AC power)).

The DC bus 2 is laid out along the installed locations of the power generators 3, the installed locations of the DC power supplies 6, and the installed locations of the load appliances 71, and functions as a bus line for supplying DC power. In addition, due to the energy management system 9 controlling charging/discharging operations of bidirectional DC/DC converters 14, described later, provided inside the plurality of DC power supplies 6, the DC bus 2 is set at a bus voltage Vbs in a predetermined voltage range that includes a nominal bus voltage (as one example, in a voltage range of DC 340V to DC 400V inclusive, including DC 370V as the nominal bus voltage).

The power generators 3 are constructed of distributed power supplies. The distributed power supplies can be composed of power generators that use natural renewable energy, such as solar power generators and wind power generators, and engine-based power generators that use fossil fuel energy, such as diesel or gasoline. In the present embodiment, for ease of understanding, the power generators 3 include one power generator 3a that is engine-based and one power generator 3b that uses natural renewable energy. The power generator 3a is started and stopped by (manual) operations by an operator or is started and stopped by instructions from the energy management system 9 (as one example in the present embodiment, the former). In the operating state, the power generator 3a generates and outputs an AC voltage V1 of a predetermined voltage value. The power generator 3a is operated when a large amount of charging power is temporarily necessary in order to charge storage batteries 11, described later, included in the plurality of DC power supplies 6, such as when the DC power supplying system 1A is first started up and when the DC power supplying system 1A is restarted after an extended stoppage. For this reason, as one example in the present embodiment, it is assumed that the power generator 3a is configured so as to be capable of generating enough power to sufficiently charge the storage batteries 11 while supplying load power to the load appliances 71. The power generator 3b is composed of one or two or more solar power generators, for example, and automatically generates power during daytime to generate and output a DC voltage V2 of a predetermined voltage value.

The first converter 4 is constructed of two power conditioners 4a and 4b disposed corresponding to the two power generators 3a and 3b in the present embodiment. As one example in the present embodiment, the power conditioner 4a is constructed so as to include an AC/DC converter and is disposed corresponding to the power generator 3a. The power conditioner 4a operates on a DC voltage that is internally generated based on the AC voltage V1, is controlled by the energy management system 9, converts the AC voltage V1 as the generated power outputted from the power generator 3a to the bus voltage Vbs and supplies the bus voltage Vbs to the DC bus 2. The power conditioner 4a also has a power measuring function that measures generated power W1 supplied from the power generator 3a to the DC bus 2 (that is, measures for a predetermined cycle T (as one example, a period of several seconds)) and outputs to the energy management system 9.

As one example, the power conditioner 4b includes a DC/DC converter and is disposed corresponding to the power generator 3b. The power conditioner 4b operates on a DC voltage that is internally generated based on the DC voltage V2, is controlled by the energy management system 9 to control the generated power by controlling power generating operations of the corresponding power generator 3b, converts the DC voltage V2 as the generated power outputted from the power generator 3b to the bus voltage Vbs, and supplies the bus voltage Vbs to the DC bus 2. The power conditioner 4b also has a power measuring function that measures generated power W2 supplied from the power generator 3b to the DC bus 2 (that is, measures for the cycle T, for example) and outputs to the energy management system 9.

As one example, the second converters 5 are constructed of DC/DC converters that operate on a DC voltage that is internally generated based on the bus voltage Vbs. In the present embodiment, for ease of understanding, it is assumed for example that the load appliances 71 (DC loads) connected to the DC power supplying system 1A are the two load appliances 71a and 71b and that the second converters 5 are composed of a second converter 5a (also referred to as the "DC/DC converter 5a") corresponding to the load appliance 71a and a second converter 5b (also referred to as the "DC/DC converter 5b") corresponding to the load appliance 71b. Here, the DC/DC converter 5a is controlled by the energy management system 9, converts the bus voltage Vbs to a load voltage VLa that is the DC voltage to be used by the load appliance 71a (DC voltage conversion) and supplies the load voltage VLa to the load appliance 71a. The DC/DC converter 5a has a current limiting function that limits the load current supplied from the DC bus 2 to the load appliance 71a to an upper limit current value set from the energy management system 9. The DC/DC converter 5a also has a power measuring function that measures load power WLa supplied from the DC bus 2 to the load appliance 71a based on the load voltage VLa and the load current (as one example, measurement in the cycle T) and outputs the load power WLa to the energy management system 9.

The DC/DC converter 5b is controlled by the energy management system 9, converts the bus voltage Vbs to a load voltage VLb that is the DC voltage to be used by the load appliance 71b (DC voltage conversion) and supplies the load voltage VLb to the load appliance 71b. The DC/DC converter 5b has a current limiting function that limits the load current supplied from the DC bus 2 to the load appliance 71b to an upper limit current value set from the energy management system 9. The DC/DC converter 5b also has a power measuring function that measures load power WLb supplied from the DC bus 2 to the load appliance 71b based on the load voltage VLb and the load current (as one example, measurement in the cycle T) and outputs the load power WLb to the energy management system 9.

Note that the load appliances 71a and 71b are DC loads that receive and operate on a supplying of the load voltages VLa and VLb that are DC voltages (hereinafter referred to as the "load voltages VL" when no distinction is made between them), and as examples, the load appliances 71a and 71b are composed of lighting equipment that operates on a DC voltage, home appliances such as televisions and refrigerators that operate on a DC voltage, and information devices, such as personal computers and mobile terminals that operate on a DC voltage.

n (where n is an integer of 2 or higher) DC power supplies $6_1, 6_2, \ldots, 6_n$ (hereinafter collectively referred to as the "DC power supplies 6" when no distinction is made between them) are disposed as the DC power supplies 6. Each DC power supply 6 includes a storage battery 11, a battery management unit (BMU) 12, a contactor 13, and a bidirectional DC/DC converter 14.

The storage batteries $11_1, 11_2, \ldots, 11_n$ (hereinafter, also referred to as the "storage batteries 11" when no particular distinction is made between them) can be constructed of lithium ion storage batteries, lead acid storage batteries, nickel hydride batteries, NaS batteries (sodium-sulfur batteries), or the like. Each storage battery 11 has a specified power capacity (nominal capacity), and is configured so as to be able to perform charging operations and discharging operations within a predetermined working voltage range including a nominal voltage.

In addition, k out of the n storage batteries 11 (as one example in the present embodiment, k storage batteries $11_1$ to $11_k$, where k is an arbitrary number of at least one but less than n) are constructed of storage batteries whose cycle characteristic has a normal specification as "first storage batteries". The remaining (n–k) storage batteries 11 (that is, the (n–k) storage batteries $11_{k+1}$ to $11_n$) are constructed of storage batteries whose cycle characteristic has a superior specification (that is, a higher-performance specification than the first storage batteries) as "second storage batteries". The expression "cycle characteristic" in the present embodiment refers to a characteristic indicating the relationship between the number of charging/discharging cycles (that is, a number of iterations where charging and then discharging counts as one cycle) and the battery capacity of the storage battery 11, and indicates that there is a relationship whereby the battery capacity gradually falls from an upper limit of the rated capacity as the number of charging/discharging cycles increases. The life of a storage battery 11 ends when the battery capacity, which falls as the number of charging/discharging cycles increases, reaches a lower limit of the rated capacity. Accordingly, the expression "superior cycle characteristic" means that the number of charging/discharging cycles until the battery capacity reaches the lower limit of the rated capacity (that is, until the end of the battery life is reached) is large. As examples, lead acid storage batteries and nickel hydride batteries are usually classified as storage batteries that have a normal cycle characteristic, and lithium ion batteries are usually classified as storage batteries that have a superior cycle characteristic.

To extend the life (i.e., increase the durability) of the storage batteries $11_1$ to $11_n$ as a whole, it is desirable to construct all of the storage batteries $11_1$ to $11_n$ of storage batteries that have a superior cycle characteristic. However, since storage batteries that have a superior cycle characteristic are costly, when all of the storage batteries $11_1$ to $11_n$ are constructed of storage batteries that have a superior cycle characteristic, there is a large increase in the cost of the DC power supplying system 1A. For this reason, in the DC power supplying system 1A, as described above, both storage batteries that have a normal cycle characteristic (that is, low-cost storage batteries) and storage batteries that have a superior cycle characteristic (that is, high-cost storage batteries) are used to minimize the increase in the cost of the DC power supplying system 1A and a charging/discharging control process described later is executed so as to make selective use of the two types of storage batteries and thereby lengthen (extend) the life of the storage batteries $11_1$ to $11_n$ as a whole. By doing so, it is possible in turn to lengthen (extend) the life of the entire DC power supplying system 1A.

BMUs $12_1, 12_2, \ldots, 12_n$ (hereinafter collectively referred to as the "BMUs 12" when no distinction is made between them) are disposed for the corresponding storage batteries $11_1, 11_2, \ldots, 11_n$ and operate on the operating voltage Vop, described later. In the operating state, as one example, each BMU 12 has a function that measures the charging voltage Vba of the storage battery 11, a function that calculates the SOC (State Of Charge or remaining battery level) by measuring a current value of a charging/discharging current of the storage battery 11, and a function of outputting, with a predetermined cycle T, information including the measured charging voltage Vba and/or current value of the charging/discharging current and/or the calculated SOC to the energy management system 9 as battery information. The BMU 12 also has a function which executes, when contactor control information has been inputted from the energy management system 9, a control content over the contactor 13 as indicated by the contactor control information (when the control content is a cutoff instruction, the contactor 13 is placed in the cutoff state and when the control content is a connection instruction, the contactor 13 is placed in the connection state).

The contactors $13_1, 13_2, \ldots, 13_n$ (hereinafter collectively referred to as the "contactors 13" when no distinction is made between them are disposed between the positive electrode and the negative electrode of the corresponding storage batteries $11_1, 11_2, \ldots, 11_n$ and a pair of input/output terminals on the storage battery $11_1, 11_2, \ldots, 11_n$-sides of the corresponding bidirectional DC/DC converters $14_1, 14_2, \ldots, 14_n$ and operate on the operating voltage Vop described later. The respective contactors 13 are controlled by the corresponding BMUs 12 to enter an arbitrary state out of the cutoff state and the connection state. When in the cutoff state, the contactors 13 cut off (that is, disconnect) the positive electrode and the negative electrode from the pair of input/output terminals, and when in the connection state, the contactors 13 connect the positive electrode and the negative electrode to the pair of input/output terminals.

The bidirectional DC/DC converters $14_1, 14_2, \ldots, 14_n$ (hereinafter collectively referred to as the "bidirectional DC/DC converters 14" when no distinction is made between them) are connected (that is, disposed) between the storage batteries 11 and the DC bus 2 by each having a pair of input/output terminals on the storage battery 11 side (that is "a first pair of input/output terminals") connected via a contactor 13 to a storage battery 11 as described above and a second pair of input/output terminals connected to the DC bus 2. k bidirectional DC/DC converters $14_1$ to $14_k$ out of the n bidirectional DC/DC converters 14 are connected to corresponding storage batteries 11 out of the storage batteries $11_1$ to $11_k$ as the first storage batteries and function as the first bidirectional converters and the remaining (n−k) bidirectional DC/DC converters $14_{k+1}$ to $14_n$ are connected to corresponding storage batteries 11 out of the storage batteries $11_{k+1}$ to $11_n$ as the second storage batteries and function as the second bidirectional converters.

Each bidirectional DC/DC converter 14 performs a CV operation (constant voltage charging/discharging operation) on a DC voltage that is internally generated based on the bus voltage Vbs and is subjected to operation control by the energy management system 9. In more detail, when the control information received from the energy management system 9 is a charging instruction, the bidirectional DC/DC converter 14 steps up or steps down (that is, performs voltage conversion for) the bus voltage Vbs inputted from the second pair of input/output terminals and outputs from the first pair of input/output terminals to the storage battery 11 to charge the storage battery 11 (that is, a charging operation is performed). Due to this, the bus voltage Vbs of the DC bus 2 falls. On the other hand, when the received control information is a discharging instruction, the bidirectional DC/DC converter 14 steps up or steps down (that is, performs voltage conversion for) the charging voltage Vba of the storage battery 11 inputted from the first pair of input/output terminals and outputs to the DC bus 2 from the second pair of input/output terminals to discharge the storage battery 11 (that is, a discharging operation is performed). Due to this, the bus voltage Vbs of the DC bus 2 rises. As the bidirectional DC/DC converters 14, as one example it is possible to use the known bidirectional DC/DC converters disclosed in Japanese Laid-open Patent Publication No. 2016-152641.

When the control information is a stopping instruction, the bidirectional DC/DC converters 14 enter a sleep state where the operation of the bidirectional DC/DC converters 14 is stopped to reduce power consumption. When a bidirectional DC/DC converter 14 in the sleep state receives a charging instruction or a discharging instruction as control information, the bidirectional DC/DC converter 14 exits the sleep state and executes a charging operation or a discharging operation. Each bidirectional DC/DC converter 14 also has a current limiting function that limits the current values of the charging current supplied to the storage battery 11 and the discharging current when discharging from the storage battery 11 to a maximum current value of the storage battery 11 or below (as described later, as one example in the present embodiment, 45 A).

The third converter 7 is composed of a DC/DC converter (and is hereinafter also referred to as the "DC/DC converter 7"). Although the DC/DC converter 7 operates on an operating voltage supplied from a dedicated power supply, not illustrated, it is also possible for the DC/DC converter 7 to operate on the bus voltage Vbs or on the charging voltage Vba of any of the storage batteries 11. In the operating state, the DC/DC converter 7 steps up or steps down (that is, performs voltage conversion for) the bus voltage Vbs or the charging voltage Vba to generate and output the operating voltage Vop to be used by the BMU 12 and the contactor 13 of each DC power supply 6 and also the energy management system 9.

The energy management system 9 is composed of a computer that operates on the operating voltage Vop and functions as a controller. The energy management system 9 executes a charging/discharging control process for each DC power supply 6, a power generation control process over the power generators 3 (the other power generators 3 aside from the power generator 3a that is subjected to manual operation control, which in the present embodiment means the power generator 3b), and a power control process over the second converters 5. The energy management system 9 also executes a voltage measuring process that measures the bus voltage Vbs. Here, the energy management system 9 may use a configuration that directly measures the bus voltage Vbs, and as another example, it is also possible to use a configuration where a first converter 4 (that is, at least one out of the power conditioners 4a and 4b) has a function that measures the bus voltage Vbs in addition to generating power and outputs to the energy management system 9 and the energy management system 9 indirectly measures the bus voltage Vbs via the first converter 4.

Next, the operation of the DC power supplying system 1A depicted in FIG. 1 will be described. Note that it is assumed that the respective contactors 13 are in the cutoff state at the start.

With the DC power supplying system 1A, when the DC power supplying system 1A is first started up, when the DC power supplying system 1A is restarted after an extended stoppage, or the like, in an imaginary case where the storage batteries $11_1$ to $11_n$ are in an overdischarged state (that is, a state where the charging voltage Vba is below the lower limit of the working voltage range), the power generator 3a is first operated for a certain period to output the AC voltage V1. For this reason, the power conditioner 4a operates on being supplied with the AC voltage V1, converts the AC voltage V1 to the bus voltage Vbs, and supplies the bus voltage Vbs to the DC bus 2. Accordingly, the bus voltage Vbs of the DC bus 2 rises to within a predetermined voltage range (the voltage range from DC 340V to DC 400V inclusive). The power conditioner 4a also measures the generated power W1 supplied from the power generator 3a to the DC bus 2 and outputs to the energy management system 9.

In the daytime, the power generator 3b automatically generates power and outputs the DC voltage V2. Due to this, the power conditioner 4b operates on being supplied with the DC voltage V2, converts the DC voltage V2 to the bus voltage Vbs, and supplies the bus voltage Vbs to the DC bus 2. Accordingly, compared to a case where only the power generator 3a is operating, the bus voltage Vbs of the DC bus 2 rises to within the predetermined voltage range described above in a shorter time. The power conditioner 4b also measures the generated power W2 supplied from the power generator 3b to the DC bus 2 and outputs to the energy management system 9.

In this DC power supplying system 1A, the DC/DC converter 7 that receives the supplying of the operating voltage from the dedicated power supply operates and outputs (supplies) the operating voltage Vop to the BMU 12 and the contactor 13 of each DC power supply 6 and also to the energy management system 9. This results in the BMU 12 and the contactor 13 of each DC power supply 6 and the energy management system 9 all being placed in the operating state.

Accordingly, the BMUs $12_1$ to $12_n$ of the DC power supplies $6_1$ to $6_n$ measure the charging voltage Vba and the like of the corresponding storage batteries $11_1$ to $11_n$ with the cycle T and output to the energy management system 9 as the battery information every time measurement is performed. The energy management system 9 in the operating state executes the charging/discharging control process.

In the charging/discharging control process at this time, the energy management system 9 calculates the total generated power (W1+W2) every time a new generated power W1 is acquired from the power conditioner 4a on the power generator 3a side (and when the power generator 3b is operating, every time a new generated power W2 is acquired from the power conditioner 4b on the power generator 3b side).

When the total generated power (W1+W2) is equal to or above a standard power set in advance, the energy management system 9 determines that it is possible to supply power to the load appliances 71 and executes control that causes the DC/DC converters 5a and 5b to convert and output the bus voltage Vbs so as to become the load voltages VLa and VLb used by the corresponding load appliances 71a and 71b. In the present embodiment, as described above, since the power generator 3a is configured so as to be capable of generating an amount of power that makes it possible to simultaneously execute the supplying of power to the load appliances 71 and charging of the storage batteries 11, the total generated power (W1+W2) will be equal to or above than the standard power. For this reason, the energy management system 9 executes control of the DC/DC converters 5a and 5b to convert and output the bus voltage Vbs to become the load voltages VLa and VLb used by the corresponding load appliances 71a and 71b. In keeping with this, the DC/DC converters 5a and 5b execute the supplying of load power to the corresponding load appliances 71a and 71b. The DC/DC converters 5a and 5b also measure the load power WLa and WLb supplied to the corresponding load appliances 71a and 71b and output to the energy management system 9. Every time new load power WLa and WLb are acquired, the energy management system 9 calculates the total load power (WLa+WLb).

The energy management system 9 compares the calculated total generated power (W1+W2) and the total load power (WLa+WLb) and when the total generated power (W1+W2) is larger than the total load power (WLa+WLb), determines that it is possible to charge the storage batteries 11 for the respective DC power supplies 6. Since the power generator 3a in the present embodiment is constructed so as to be capable of generating an amount of power that makes it possible to simultaneously execute the supplying of power to the load appliances 71 and charging of the storage batteries 11, the total generated power (W1+W2) will be larger than the total load power (WLa+WLb) and the energy management system 9 will determine that it is possible to charge the storage batteries of the respective DC power supplies 6.

When it has been determined in this way that charging is possible, the energy management system 9 determines whether, in the normal operation state (that is, a state where the power generator 3a is not operating), an absolute value Wab(=|(W1+W2)−(WLa+WLb)|) of a power difference between the generated power generated at the power generators (in the present embodiment, the total generated power (W1+W2) at the power generators 3a and 3b) and the load power supplied to the load appliances (in the present embodiment the total load power (WLa+WLb) supplied to the load appliances 71a and 71b) is equal to or greater than a power threshold Wth that is set in advance. As one example, it is possible to set the power when charging and discharging k storage batteries 11 as the first storage batteries (that is, the storage batteries $11_1$ to $11_k$) at the same charging/discharging current rate (as one example, 0.5 C) as this power threshold Wth. That is, when the power capacity (the nominal capacity) of each storage battery $11_i$ (where i is an arbitrary number from 1 to k) out of the storage battery $11_1$ to storage battery $11_k$ is expressed as "$X_i$", the total of the charging/discharging power for the respective storage batteries $11_i$ with this common charging/discharging current rate, expressed as, $$X_1 \times 0.5 \times Vbs + X_2 \times 0.5 \times Vbs + \ldots + X_i \times 0.5 \times Vbs + \ldots + X_k \times 0.5 \times Vbs$$

can be set as the power threshold Wth.

Also, when as a result of this determination, the absolute value Wab of the power difference is equal to or greater than the power threshold Wth, the energy management system 9 determines to operate the (n−k) bidirectional DC/DC converters $14_{k+1}$ to $14_n$ as second bidirectional converters so as to perform charging of the storage batteries $11_{k+1}$ to $11_n$ as the second storage batteries that have a superior cycle characteristic. The reason for this (or the "first reason") is that when the absolute value Wab of the power difference is equal to or greater than the power threshold Wth, since the amount of charging power supplied to the storage batteries 11 is large, it is easy for the storage batteries 11 to reach a fully charged state (that is, the time required to reach the fully charged state is shortened), and as a result, there is a tendency for the number of charging/discharging cycles to increase faster. Accordingly, charging of the storage batteries $11_{k+1}$ to $11_n$ that have a superior cycle characteristic (that is, a large number of charging/discharging cycles) is performed to reduce the rate at which deterioration of the storage batteries $11_1$ to $11_n$ as a whole progresses.

On the other hand, when as a result of this determination, the absolute value Wab of the power difference is less than the power threshold Wth, the energy management system 9 determines to operate the k bidirectional DC/DC converters $14_1$ to $14_k$ as the first bidirectional converters so as to perform charging of the storage batteries $11_1$ to $11_k$ as the first storage batteries that have a normal cycle characteristic (that is, the cycle characteristic is not particularly high). The reason for this (or the "second reason") is that when the absolute value Wab of the power difference is less than the power threshold Wth, since the amount of charging power supplied to the storage batteries 11 is small, it is difficult for the storage batteries 11 to reach a fully charged state (that is, the time required to reach the fully charged state increases), and as a result, there is a tendency for the number of charging/discharging cycles to increase more slowly. Accordingly, even if charging of the storage batteries $11_1$ to $11_k$ that have a normal cycle characteristic (that is, a typical number of charging/discharging cycles) is performed, deterioration of the storage batteries $11_1$ to $11_n$ as a whole is unlikely to progress.

By doing so, the energy management system 9 determines to execute charging of the storage batteries $11_1$ to $11_k$ as the first storage batteries (hereinafter also referred to as the "first storage battery group") or to execute charging of the storage batteries $11_{k+1}$ to $11_n$ as the second storage batteries (hereinafter also referred to as the "second storage battery group"). After this, the energy management system 9 specifies which DC power supplies 6 have chargeable storage batteries 11 (that is, storage batteries 11 whose charging voltage Vba has not reached the upper limit of the working voltage range) based on the battery information acquired from the BMU 12 of each DC power supply 6 that includes the storage battery group (either the first storage battery group or the second storage battery group) determined as the target of charging, outputs contact control information indicating a connection instruction to the BMUs 12 of the specified DC power supplies 6, and outputs control information indicating a charging instruction to the bidirectional DC/DC converters 14 of these DC power supplies 6 (that is, the energy management system 9 executes a charging operation).

However, when the power generator 3a is operating (a state that is not the "normal operation state" referred to above, that is, for the present embodiment, when the system is first started up or is restarted after an extended stoppage) and the energy management system 9 has determined that charging is possible as described above, since all of the storage batteries $11_1$ to $11_n$ are in an overdischarged state at this time, the energy management system 9 does not distinguish between the first storage battery group and the second storage battery group and determines to execute charging of all of the storage batteries $11_1$ to $11_n$.

In this case, the energy management system 9 specifies that, based on the battery information acquired from the BMUs 12 of the DC power supplies $6_1$ to $6_n$, all of the DC power supplies $6_1$ to $6_n$ are the DC power supplies that have a chargeable storage battery 11 (that is, a storage battery 11 whose charging voltage Vba has not reached the upper limit of the working voltage range), outputs contact control information indicating a connection instruction to the BMUs $12_1$ to $12_n$ of all of the DC power supplies $6_1$ to $6_n$ that have been specified, and outputs control information indicating a charging instruction to the bidirectional DC/DC converters $14_1$ to $14_n$ of all of these DC power supplies 6 (that is, the energy management system 9 executes a charging operation).

By doing so, since the contactor 13 in each DC power supply $6_1$ to $6_n$ is placed in a connection state so that the storage batteries $11_1$ to $11_n$ are connected via the contactors $13_1$ to $13n$ in the connection state to the bidirectional DC/DC converters $14_1$ to $14_n$ that perform a charging operation, charging of the storage batteries $11_1$ to $11_n$ is executed. Here, the energy management system 9 detects whether the charging voltage Vba included in the battery information outputted in the cycle T from the BMU 12 of each DC power supply 6 has reached the upper limit of the working voltage range (or whether the SOC (the remaining battery level) included in the battery information has reached 100%, that is, whether a storage battery 11 has reached the fully charged state) and on determining that the fully charged state has been reached, the energy management system 9 outputs contact control information indicating a cutoff instruction to the BMU 12 of the DC power supply 6 that includes that storage battery 11 to place that contactor 13 in the cutoff state and thereby disconnect that storage battery 11 from the bidirectional DC/DC converter 14. By doing so, overcharging of the storage battery 11 is prevented.

As described above, the DC power supplying system 1A is configured so that in cases when the DC power supplying system 1A is first started up and when the DC power supplying system 1A is restarted after an extended stoppage, the power generator 3a is operated for a certain period to supply the generated power W1 to the DC bus 2. This means that during the certain period, it is possible to supply the load voltages VLa and VLb with sufficient power from the DC bus 2 to the load appliances 71a and 71b and simultaneously sufficiently charge the storage batteries 11 included in the all of the DC power supplies $6_1$ to $6_n$ (that is, charging until the charging voltage Vba becomes the upper limit of the working voltage range (i.e., the fully charged state)). Note that when the storage batteries 11 of the DC power supplies 6 have all been sufficiently charged before the certain period for which the power generator 3a operates has ended, by executing the power control process described above for the second converters 5, the energy management system 9 may produce a state likely to increase the total load power (WLa+WLb) and reallocate the power that was allocated to charging the storage batteries 11 to the load appliances 71. The energy management system 9 may also be provided with a display or the like that informs an operator present at the installed location of the power generator 3a that all of the storage batteries 11 have been sufficiently charged and urges the operator to stop the power generator 3a.

When the certain period ends, the power generator 3*a* is stopped. By doing so, after the end of the certain period, the DC power supplying system 1A switches to a normal operation state where only the power generator 3*b* automatically operates and generates power in keeping with the natural state.

In the DC power supplying system 1A operating in this normal operation state, the energy management system 9 executes the charging/discharging control process as described below.

First, during the charging/discharging control process in a natural state where the power generator 3*b* is generating power (in the present embodiment, since the power generator 3*b* is constructed of a solar power generator, during daytime), the energy management system 9 calculates the total generated power (here, only the generated power W2) and the total load power (WLa+WLb) every time new generated power W2 is acquired from the power conditioner 4*b* of the power generator 3*b* and/or new load power WLa and WLb is acquired from the DC/DC converters 5*a* and 5*b* of the load appliances 71*a* and 71*b*.

Next, the energy management system 9 compares the calculated total generated power (W2) and the total load power (WLa+WLb) and when the total generated power (W2) is larger than the total load power (WLa+WLb) (as one example, when the insolation amount is high, so that the generated power W2 of the power generator 3*b* is large), a power surplus is produced, and therefore the energy management system 9 determines that charging of the storage batteries 11 of the respective DC power supplies 6 is possible.

Also, on determining in this way that charging is possible in the normal operation state, the energy management system 9 determines whether an absolute value Wab(=|(W2)−(WLa+WLb)|) of a power difference between the generated power generated at the power generators (in the present embodiment, the total generated power (W2) generated at the power generator 3*b*) and the load power supplied to the load appliances (in the present embodiment, the total load power (WLa+WLb) supplied to the load appliances 71*a* and 71*b*) is equal to or greater than the power threshold Wth that is set in advance.

When as a result of this determination, the absolute value Wab of the power difference is equal to or greater than the power threshold Wth, based on the first reason given above, the energy management system 9 determines to operate the (n−k) bidirectional DC/DC converters 14$_{k+1}$ to 14$_n$ as the second bidirectional converters to charge the storage batteries 11$_{k+1}$ to 11$_n$ (the second storage battery group) as the second storage batteries that have a superior cycle characteristic.

On the other hand, when as a result of this determination, the absolute value Wab of the power difference is less than the power threshold Wth, based on the second reason given above, the energy management system 9 determines to operate the k bidirectional DC/DC converters 14$_1$ to 14$_k$ as the first bidirectional converters to charge the storage batteries 11$_1$ to 11$_k$ (the first storage battery group) as the first storage batteries that have a normal cycle characteristic (a cycle characteristic that is not particularly high).

By operating in this way, the energy management system 9 determines whether to perform charging of the storage batteries 11$_1$ to 11$_k$ (the first storage battery group) or whether to perform charging of the storage batteries 11$_{k+1}$ to 11$_n$ (the second storage battery group), and then specifies which DC power supplies 6 have chargeable storage batteries 11 (that is, storage batteries 11 whose charging voltage Vba has not reached the upper limit of the working voltage range) based on the battery information acquired from the BMU 12 of each DC power supply 6 that includes the storage battery group (either the first storage battery group or the second storage battery group) determined as the target of charging, outputs contact control information indicating a connection instruction to the BMUs 12 of the specified DC power supplies 6, and outputs control information indicating a charging instruction to the bidirectional DC/DC converters 14 of these DC power supplies 6 (that is, the energy management system 9 executes a charging operation).

By doing so, at a DC power supply 6 with a chargeable storage battery 11 (that is, a storage battery 11 in the storage battery group determined as the target of charging), since the storage battery 11 is connected via the contactor 13 that has been placed in the connection state to the bidirectional DC/DC converter 14 and the bidirectional DC/DC converter 14 performs a charging operation, charging of the storage battery 11 is executed. Here, the energy management system 9 controls the number of DC power supplies 6 that execute a charging operation and/or the time for which a charging operation is executed to control the charging power to be supplied from the DC bus 2 to the DC power supplies 6 and thereby keep the bus voltage Vbs being measured in the predetermined voltage range described above (the voltage range of DC 340V to DC 400V, inclusive).

Also, on determining, while detecting whether the charging voltage Vba included in the battery information outputted in the cycle T from the BMU 12 of a DC power supply 6 performing a charging operation has reached the upper limit of the working voltage range (or that the SOC included in the battery information has reached 100%, that is, the storage battery 11 has reached the fully charged state), that the fully charged state has been reached, the energy management system 9 outputs contact control information indicating a cutoff instruction to the BMU 12 of the DC power supply 6 including that storage battery 11 in the fully charged state to set the contactor 13 in the cutoff state and thereby disconnect the storage battery 11 from the bidirectional DC/DC converter 14. By doing so, overcharging of the storage batteries 11 is prevented.

On the other hand, when as a result of comparing the total generated power (W2) and the total load power (WLa+WLb) in the normal operation state, the total generated power (W2) is smaller than the total load power (WLa+WLb) (for example, when the insolation amount is low, so that the generated power W2 of the power generator 3*b* is small), a power insufficiency is produced for the load power, so that the energy management system 9 determines that discharging from the storage batteries 11 of the DC power supplies 6 is necessary.

Also, on determining in this way that discharging is necessary in the normal operation state, the energy management system 9 determines whether the absolute value Wab(=|(W2)−(WLa+WLb)|) of the power difference between the generated power generated at the power generators (in the present embodiment, the total generated power (W2) generated at the power generator 3*b*) and the load power supplied to the load appliances (in the present embodiment, the total load power (WLa+WLb) supplied to the load appliances 71*a* and 71*b*) is equal to or greater than the power threshold Wth that is set in advance.

Also, when as a result of this determination, the absolute value Wab of the power difference is equal to or greater than the power threshold Wth, the energy management system 9 determines to operate the (n−k) bidirectional DC/DC converters 14$_{k+1}$ to 14$_n$ as the second bidirectional converters so as to perform discharging of the storage batteries $11_{k+1}$ to $11_n$ (the second storage battery group) as the second storage batteries that have a superior cycle characteristic. The reason for this (or the "third reason") is that when the absolute value Wab of the power difference is equal to or greater than the power threshold Wth, since the amount of discharging power supplied from the storage batteries 11 is large, the charging voltage Vba of the storage batteries 11 is more likely to reach the lower limit of the working voltage range (that is, the time required for the charging voltage Vba to reach the lower limit of the working voltage range is reduced), and as a result, there is a tendency for the number of charging/discharging cycles to increase faster. Accordingly, discharging of the storage batteries $11_{k+1}$ to $11_n$ that have a superior cycle characteristic (that is, a large number of charging/discharging cycles) is performed to reduce the rate at which deterioration of the storage batteries $11_1$ to $11_n$ as a whole progresses.

On the other hand, when as a result of this determination, the absolute value Wab of the power difference is less than the power threshold Wth, the energy management system 9 determines to operate the k bidirectional DC/DC converters $14_1$ to $14_k$ as the first bidirectional converters so as to perform discharging of the storage batteries $11_1$ to $11_k$ (the first storage battery group) as the first storage batteries that have a normal cycle characteristic (that is, the cycle characteristic is not particularly high). The reason for this (or the "fourth reason") is that when the absolute value Wab of the power difference is less than the power threshold Wth, since the amount of discharging power supplied from the storage batteries 11 is small, the charging voltage Vba of the storage batteries 11 is unlikely to reach the lower limit of the working voltage range (that is, the time required for the charging voltage Vba to reach the lower limit of the working voltage range increases), and as a result, there is a tendency for the number of charging/discharging cycles to increase more slowly. Accordingly, even if charging of the storage batteries $11_1$ to $11_k$ that have a normal cycle characteristic (that is, a typical number of charging/discharging cycles) is performed, deterioration of the storage batteries $11_1$ to $11_n$ as a whole is unlikely to progress.

By operating in this way, the energy management system 9 determines whether to perform discharging of the storage batteries $11_1$ to $11_k$ (the first storage battery group) as the first storage batteries or whether to perform discharging of the storage batteries $11_{k+1}$ to $11_n$ (the second storage battery group) as the second storage batteries, and then specifies which DC power supplies 6 have dischargeable storage batteries 11 (that is, storage batteries 11 whose charging voltage Vba has not reached the lower limit of the working voltage range) based on the battery information acquired from the BMU 12 of each DC power supply 6 that includes the storage battery group (either the first storage battery group or the second storage battery group) determined as the target of discharging, outputs contact control information indicating a connection instruction to the BMUs 12 of the specified DC power supplies 6, and outputs control information indicating a discharging instruction to the bidirectional DC/DC converters 14 of these DC power supplies 6 (that is, the energy management system 9 executes a discharging operation).

By doing so, at a DC power supply 6 with a dischargeable storage battery 11 (that is, a storage battery 11 in the storage battery group determined as the target of discharging), since the storage battery 11 is connected via the contactor 13 that has been placed in the connection state to the bidirectional DC/DC converter 14 and the bidirectional DC/DC converter 14 performs a discharging operation, the charging voltage Vba of the storage battery 11 is stepped up or stepped down (that is, voltage conversion is performed) and outputted to the DC bus 2 (that is, the storage battery 11 is discharged). Here, the energy management system 9 controls the number of DC power supplies 6 that execute a discharging operation and/or the time for which a discharging operation is executed to control the discharging power to be supplied from the DC power supplies 6 to the DC bus 2 and thereby keep the bus voltage Vbs being measured in the predetermined voltage range described above (the voltage range of DC 340V to DC 400V, inclusive).

If, as a result of any of the DC power supplies 6 continuously executing the discharging operation described above, the charging voltage Vba of the corresponding storage battery 11 reaches the lower limit of the working voltage range, the energy management system 9 detects this based on the battery information acquired from the corresponding BMU 12 and outputs contact control information indicating a cutoff instruction to the BMU 12 of that DC power supply 6. By doing so, at that DC power supply 6, the contactor 13 will be placed in the cutoff state by the BMU 12, which disconnects the storage battery 11 from the bidirectional DC/DC converter 14 (that is, the discharging operation is stopped). This means that overdischarging of the storage batteries 11 is prevented.

In the DC power supplying system 1A, if the DC/DC converters 5a and 5b continue the operation of supplying load power to the load appliances 71a and 71b in a state where in all of the DC power supplies 6 with storage batteries 11 in the storage battery group determined as the target of discharging, the storage batteries 11 have been cut off from the bidirectional DC/DC converters 14 (that is, the discharging operations have stopped), there is the risk that the bus voltage Vbs will fall and drop below the lower limit voltage (DC 340V) of the predetermined voltage range (in the present embodiment, the range of DC 340V to DC 400V, inclusive). For this reason, to keep the bus voltage Vbs being measured in the predetermined voltage range (in the present embodiment, the range of DC 340V to DC 400V, inclusive) described above, the energy management system 9 executes the power control process that changes the upper limit current value set for the second converters 5 (in the present embodiment, at least one out of the DC/DC converters 5a and 5b) to reduce the total load power (WLa+WLb) (or increase the total load power (WLa+WLb) when the generated power W2 has increased).

Next, the charging/discharging control process during the normal operation state in a natural state where the power generator 3b is not generating power (or the "generation stopped state") (in the present embodiment, since the power generator 3b is constructed of a solar power generator, night-time) will be described.

In the charging/discharging control process, since the total generated power (W2) is substantially zero, the energy management system 9 executes the same operation as when the total generated power (W2) is smaller than the total load power (WLa+WLb) described above.

Accordingly, since a power insufficiency is produced for the load power supplied to the load appliances 71a and 71b, the energy management system 9 determines that discharging from the storage batteries 11 of the DC power supplies 6 is necessary.

Also, on determining in this way that discharging is necessary in the normal operation state, the energy management system 9 determines whether the absolute value Wab(=|(W2)−(WLa+WLb)|) of the power difference between the generated power generated at the power generators (the total generated power (W2) generated at the power generator 3b, at this time, substantially zero) and the load power supplied to the load appliances (in the present embodiment, the total load power (WLa+WLb) supplied to the load appliances 71a and 71b) is equal to or greater than the power threshold Wth that is set in advance.

Also, when as a result of this determination, the absolute value Wab of the power difference is equal to or greater than the power threshold Wth, based on the third reason given above, the energy management system 9 determines to operate the (n−k) bidirectional DC/DC converters $14_{k+1}$ to $14_n$ as the second bidirectional converters so as to perform discharging of the storage batteries $11_{k+1}$ to $11_n$ (the second storage battery group) as the second storage batteries that have a superior cycle characteristic.

On the other hand, when as a result of this determination, the absolute value Wab of the power difference is less than the power threshold Wth, based on the third reason given above, the energy management system 9 determines to operate the k bidirectional DC/DC converters $14_1$ to $14_k$ as the first bidirectional converters so as to perform discharging of the storage batteries $11_1$ to $11_k$ (the first storage battery group) as the first storage batteries that have a normal cycle characteristic (that is, the cycle characteristic is not particularly high).

By operating in this way, the energy management system 9 determines whether to perform discharging of the storage batteries $11_1$ to $11_k$ (the first storage battery group) as the first storage batteries or whether to perform discharging of the storage batteries $11_{k+1}$ to $11_n$ (the second storage battery group) as the second storage batteries, and then specifies which DC power supplies 6 have dischargeable storage batteries 11 (that is, storage batteries 11 whose charging voltage Vba has not reached the lower limit of the working voltage range) based on the battery information acquired from the BMU 12 of each DC power supply 6 that includes the storage battery group (either the first storage battery group or the second storage battery group) determined as the target of discharging, outputs contact control information indicating a connection instruction to the BMUs 12 of the specified DC power supplies 6, and outputs control information indicating a discharging instruction to the bidirectional DC/DC converters 14 of these DC power supplies 6 (that is, the energy management system 9 executes a discharging operation).

By doing so, at a DC power supply 6 with a dischargeable storage battery 11 (that is, a storage battery 11 in the storage battery group determined as the target of discharging), since the storage battery 11 is connected via the contactor 13 that has been placed in the connection state to the bidirectional DC/DC converter 14 and the bidirectional DC/DC converter 14 performs a discharging operation, the charging voltage Vba of the storage battery 11 is stepped up or stepped down (that is, voltage conversion is performed) and outputted to the DC bus 2 (that is, the storage battery 11 is discharged). Here, the energy management system 9 controls the number of DC power supplies 6 that execute a discharging operation and/or the time for which a discharging operation is executed to control the discharging power to be supplied from the DC power supplies 6 to the DC bus 2 and thereby keep the bus voltage Vbs being measured in the predetermined voltage range described above (the voltage range of DC 340V to DC 400V, inclusive). By doing so, the DC/DC converters 5a and 5b become capable of generating the load voltages VLa and VLb for the corresponding load appliances 71a and 71b.

After this, when the charging voltage Vba of a storage batteries 11 being discharged has reached the lower limit of the working voltage range, the DC power supplies 6 place the respective contactors 13 in the cutoff state based on contact control information indicating a cutoff instruction from the energy management system 9 to stop the discharging operation. Here, since there is no device that can supply power to the DC bus 2, the energy management system 9 outputs control information indicating a stopping instruction to the bidirectional DC/DC converters 14 of all of the DC power supplies 6 to stop the operations of the bidirectional DC/DC converters 14.

Note that when, after determining whether to perform discharging of the storage batteries $11_1$ to $11_k$ (the first storage battery group) as the first storage batteries or whether to perform discharging of the storage batteries $11_{k+1}$ to $11_n$ (the second storage battery group) as the second storage batteries, the energy management system 9 has not been able to specify a DC power supply 6 with a dischargeable storage battery 11 (that is, a storage battery 11 whose charging voltage Vba has not reached the lower limit of the working voltage range) based on the battery information acquired from the BMU 12 of each DC power supply 6 that includes the storage battery group (either the first storage battery group or the second storage battery group) determined to be the target of discharging, the energy management system 9 immediately outputs control information indicating a stopping instruction to the bidirectional DC/DC converters 14 of all of the DC power supplies 6 to stop the operations of the bidirectional DC/DC converters 14.

Note also that the DC power supplying system 1A uses a configuration where in all of the DC power supplies 6, the contactors 13 are disposed between the storage batteries 11 and the bidirectional DC/DC converters 14, and when there is no device capable of supplying power to the DC bus 2 as described above, all of the contactors 13 are placed in the cutoff state to cut off (disconnect) the storage batteries 11 and the bidirectional DC/DC converters 14. This means that in the DC power supplying system 1A according to the present embodiment, it is not necessary to go so far as to stop the operation of the bidirectional DC/DC converters 14. However, a DC power supply configured without the contactors 13 is also conceivable (that is, a DC power supply configured with the storage batteries 11 directly connected to the bidirectional DC/DC converters 14), and in a DC power supplying system equipped with DC power supplies of this configuration, it is possible to completely stop discharging from the storage batteries 11 by stopping the operations of the bidirectional DC/DC converters 14.

In this way, the DC power supplying system 1A is equipped with the k storage batteries $11_1$ to $11_k$ as the first storage batteries that have a normal cycle characteristic and the (n−k) storage batteries $11_{k+1}$ to $11_n$ as the second storage batteries that have a superior cycle characteristic, and when the absolute value Wab of the power difference between the total generated power (W1+W2) generated at the power generators 3a and 3b and the total load power (WLa+WLb) supplied to the load appliances 71a and 71b is equal to or greater than the power threshold Wth, the energy management system 9 as the controller operates the (n−k) bidirectional DC/DC converters $14_{k+1}$ to $14_n$ as the second bidirectional converters to charge or discharge the storage batteries $11_{k+1}$ to $11_n$ that have a superior cycle characteristic. On the other hand, when the absolute value Wab of the power difference is less than the power threshold Wth, the energy management system 9 operates the k bidirectional DC/DC converters $14_1$ to $14_k$ as the first bidirectional converters to charge or discharge the storage batteries $11_1$ to $11_k$ that have a normal cycle characteristic.

This means that according to the DC power supplying system 1A, it is possible to lengthen (extend) the life of the storage batteries $11_1$ to $11_n$ as a whole and in turn to lengthen (extend) the life of the DC power supplying system 1A as a whole by executing the charging/discharging control process described above and making selective use of the storage batteries $11_1$ to $11_k$ (the first storage batteries) that have a normal cycle characteristic and the storage batteries $11_{k+1}$ to $11_n$ (the second storage batteries) that have a superior cycle characteristic, while minimizing, through the concurrent use of storage batteries that have a normal cycle characteristic (that is, lower-cost storage batteries), the increase in the overall cost of the DC power supplying system 1A, compared to a case where all of the storage batteries $11_1$ to $11_n$ are composed of second storage batteries that have a superior cycle characteristic.

Figure 2:
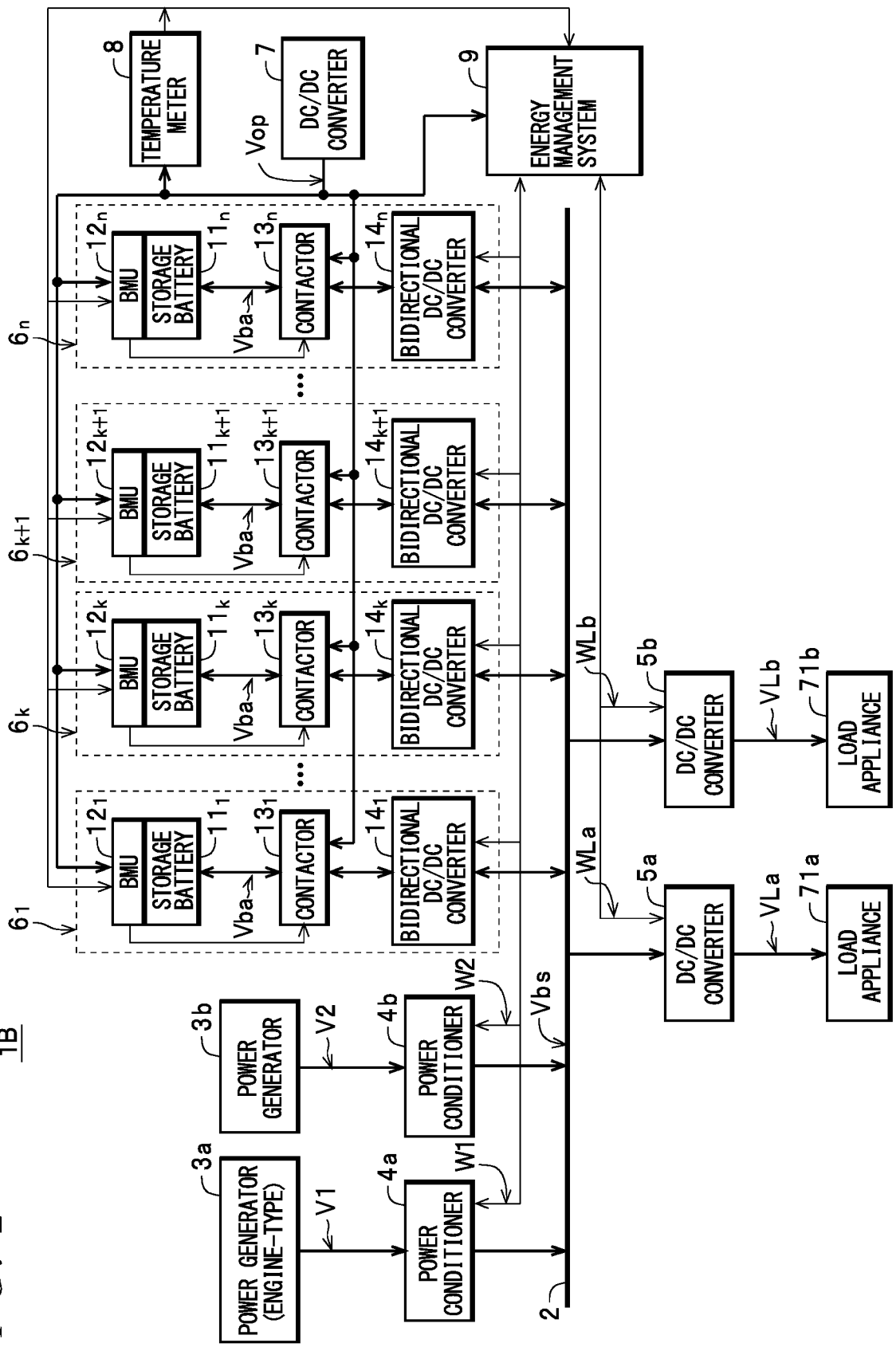
FIG. 2 is a diagram depicting the configuration of another DC power supplying system 1B.

Note that aside from the DC power supplying system 1A described above, it is also possible to lengthen (extend) the life of the storage batteries 11 as a whole with a DC power supplying system 1B of the configuration depicted in FIG. 2. This DC power supplying system 1B will now be described. Configurations that are the same as the DC power supplying system 1A have been assigned the same reference numerals, duplicated description is omitted, and the description will instead focus on the differences.

First, the configuration of the DC power supplying system 1B as a DC power supplying system will be described.

As depicted in FIG. 2, the DC power supplying system 1B includes a temperature meter 8 in addition to the DC bus 2, one or two or more power generators 3, the first converters 4 disposed corresponding to the power generators 3, the second converters 5 disposed corresponding to the load appliances 71 connected to the DC power supplying system 1B, the plurality of DC power supplies 6, the third converter 7, and the energy management system 9 that are all the same as in the DC power supplying system 1A.

The temperature meter 8 operates on the operating voltage Vop to measure the temperature (battery temperature) of the storage batteries $11_1$ to $11_n$ of the DC power supplies $6_1$ to $6_n$ (measurement with a predetermined cycle T) and outputs temperature information indicating the measured temperature to the energy management system 9. Note that when the BMUs 12 disposed for the storage batteries 11 of the respective DC power supplies 6 have a function of monitoring the temperature of the corresponding storage batteries 11 and transmitting the temperature to the energy management system 9 as part of the battery information, it is also possible to have the BMUs 12 function as the temperature meter. When this configuration is used, it is possible to configure the system so as to not include a temperature meter that is separate to the BMUs 12.

In a DC power supplying system with storage batteries 11 like the DC power supplying system 1B, it is known that in addition to being affected by whether the absolute value Wab of the power difference between the total generated power (W1+W2) at the power generators 3a and 3b and the total load power (WLa+WLb) supplied to the load appliances 71a and 71b is equal to or greater than the power threshold Wth, the extent to which deterioration of the storage batteries 11 progresses (that is, the rate at which the working life becomes shorter) is greatly affected by temperature (that is, deterioration progresses faster when charging and discharging are repeated in a high-temperature environment). This means that with the DC power supplying system 1B, it is possible to lengthen (extend) the life of the storage batteries $11_1$ to $11_n$ as a whole in a high temperature environment while minimizing the increase in the overall cost of the DC power supplying system 1B in the same way as the DC power supplying system 1A.

Next, the operation of the DC power supplying system 1B depicted in FIG. 2 will be described. Note that detailed description of operations that are the same as the operations of the DC power supplying system 1A has been omitted, and the description will instead contrast different operations with the operations of the DC power supplying system 1A.

In the DC power supplying system 1A described above, during the charging/discharging control process where the energy management system 9 charges and discharges the storage batteries 11, as described above, by operating the (n−k) bidirectional DC/DC converters $14_{k+1}$ to $14_n$ as the second bidirectional converters when the absolute value Wab of the power difference described above is equal to or greater than the power threshold Wth to perform charging or discharging of the storage batteries $11_{k+1}$ to $11_n$ as the second storage batteries that have a superior cycle characteristic and operating the k bidirectional DC/DC converters $14_1$ to $14_k$ as the second bidirectional converters when the absolute value Wab of the power difference described above is less than the power threshold Wth to perform charging or discharging of the storage batteries $11_1$ to $11_k$ as the first storage batteries that have a normal cycle characteristic, the extent to which deterioration of the storage batteries $11_1$ to $11_n$ progresses is reduced (that is, the life is lengthened).

On the other hand, in the DC power supplying system 1B, in the charging/discharging control process that charges and discharges the storage batteries 11, when the temperature of the storage batteries 11 measured by the temperature meter 8 is equal to or greater than a temperature threshold Tth (for example, 40°) set in advance, in the same way as when the absolute value Wab of the power difference is equal to or greater than the power threshold Wth in the DC power supplying system 1A described above, the energy management system 9 operates (n−k) bidirectional DC/DC converters $14_{k+1}$ to $14_n$ as the second bidirectional converters to perform charging or discharging of the storage batteries $11_{k+1}$ to $11_n$ as the second storage batteries that have a superior cycle characteristic. When the temperature of the storage batteries 11 is less than the temperature threshold Tth, in the same way as when the absolute value Wab of the power difference is less than the power threshold Wth in the DC power supplying system 1A described above, the energy management system 9 operates the k bidirectional DC/DC converters $14_1$ to $14_k$ as the first bidirectional converters to perform charging or discharging of the storage batteries $11_1$ to $11_k$ as the first storage batteries that have a normal cycle characteristic. Note that the temperature threshold Tth is not limited to 40° and can be set at any arbitrary value.

This means that according to the DC power supplying system 1B, even in an environment where the temperature of the storage batteries 11 may become high (that is, may rise to the temperature threshold Tth or above), it is possible to lengthen (extend) the life of the storage batteries $11_1$ to $11_n$ as a whole and in turn to lengthen (extend) the life of the DC power supplying system 1B as a whole by executing the charging/discharging control process described above and making selective use of the storage batteries $11_1$ to $11_k$ (the first storage batteries) that have a normal cycle characteristic and the storage batteries $11_{k+1}$ to $11_n$ (the second storage batteries) that have a superior cycle characteristic while minimizing, through the concurrent use of storage batteries that have a normal cycle characteristic (that is, lower-cost storage batteries), the increase in the overall cost of the DC power supplying system 1B, compared to a case where all of the storage batteries $11_1$ to $11_n$ are composed of second storage batteries that have a superior cycle characteristic.

INDUSTRIAL APPLICABILITY

According to the present invention, since it is possible to extend the life of storage batteries, the present invention can be widely applied in standalone DC power supplying systems that require storage batteries.

REFERENCE SIGNS LIST 1A, 1B DC power supplying system
2 DC bus
3a, 3b Power generator
4a, 4b Power conditioner (first converter)
5a, 5b DC/DC converter (second converter)
8 Temperature meter
9 Energy management system
$11_1$ to $11_k$ Storage battery (first storage battery)
$11_{k+1}$ to $11_n$ Storage battery (second storage battery)
$14_1$ to $14_k$ Bidirectional DC/DC converter (first bidirectional converter)
$14_{k+1}$ to $14_n$ Bidirectional DC/DC converter (second bidirectional converter)
71a, 71b Load appliance

What is claimed is:

1. A direct current (DC) power supplying system comprising:
a DC bus that serves as a bus line of a DC power supply;
a power generator;
a first converter that supplies generated power generated at the power generator to the DC bus;
a first storage battery;
a second storage battery that has a superior cycle characteristic compared to the first storage battery;
a first bidirectional converter that is connected between the first storage battery and the DC bus, bidirectionally converts power between the generated power supplied to the DC bus and charging power of the first storage battery, and supplies power from the DC bus to the first storage battery or from the first storage battery to the DC bus;
a second bidirectional converter that is connected between the second storage battery and the DC bus, bidirectionally converts power between the generated power supplied to the DC bus and charging power of the second storage battery, and supplies power from the DC bus to the second storage battery or from the second storage battery to the DC bus;
a second converter that supplies DC power that is at least one of the generated power supplied to the DC bus and the charging power to a load appliance; and
a controller that is operable when an absolute value of a power difference between the generated power generated at the power generator and the load power being supplied to the load appliance is equal to or greater than a power threshold set in advance, to operate the second bidirectional converter and operable when the absolute value of the power difference is less than the power threshold to operate the first bidirectional converter.

2. A direct current (DC) power supplying system comprising:
a DC bus that serves as a bus line of a DC power supply;
a power generator;
a first converter that supplies generated power generated at the power generator to the DC bus;
a first storage battery;
a second storage battery that has a superior cycle characteristic compared to the first storage battery;
a first bidirectional converter that is connected between the first storage battery and the DC bus, bidirectionally converts power between the generated power supplied to the DC bus and charging power of the first storage battery, and supplies power from the DC bus to the first storage battery or from the first storage battery to the DC bus;
a second bidirectional converter that is connected between the second storage battery and the DC bus, bidirectionally converts power between the generated power supplied to the DC bus and charging power of the second storage battery, and supplies power from the DC bus to the second storage battery or from the second storage battery to the DC bus;
a second converter that supplies DC power that is at least one of the generated power supplied to the DC bus and the charging power to a load appliance;
a temperature meter that measures a battery temperature of the first storage battery and the second storage battery; and
a controller that is operable when the measured battery temperature is equal to or greater than a temperature threshold set in advance, to operate the second bidirectional converter and operable when the battery temperature is less than the temperature threshold to operate the first bidirectional converter.

* * * * *